United States Patent [19]
Lindsey et al.

[11] Patent Number: 5,704,868
[45] Date of Patent: Jan. 6, 1998

[54] VARIABLE ANGLE FRONT OUTPUT SHAFT TRANSFER CASE

[75] Inventors: Mark A. Lindsey, Westland; Lance M. Tobey, Livonia, both of Mich.; Craig B. Fowler, Maumee, Ohio

[73] Assignee: Borg-Warner Automotive, Inc., Sterling Heights, Mich.

[21] Appl. No.: 571,042

[22] Filed: Dec. 12, 1995

[51] Int. Cl.$^6$ ........................................ F16H 57/02
[52] U.S. Cl. ............................. 475/222; 74/606 R
[58] Field of Search ................. 475/222; 74/606 R; 180/247, 248

[56] References Cited

U.S. PATENT DOCUMENTS

| | | | |
|---|---|---|---|
| 3,636,909 | 1/1972 | Benson, Jr. | 74/606 R |
| 4,083,419 | 4/1978 | Fogelberg | 180/44 |
| 4,103,753 | 8/1978 | Holdeman | 180/49 |
| 4,289,213 | 9/1981 | Seaman | 180/233 |
| 4,303,400 | 12/1981 | Yano et al. | 440/75 |
| 4,458,557 | 7/1984 | Hayakawa | 74/665 |
| 4,632,207 | 12/1986 | Moore | 180/247 |
| 4,651,847 | 3/1987 | Hermanns | 180/245 |
| 4,860,612 | 8/1989 | Dick et al. | 74/665 |
| 4,989,686 | 2/1991 | Miller et al. | 180/197 |
| 5,286,232 | 2/1994 | Engle | 464/162 |

*Primary Examiner*—Dirk Wright
*Attorney, Agent, or Firm*—Thomas A. Meehan, Esq.; Greg Dziegielewski

[57] ABSTRACT

A transfer case having a housing (10) which rotatably receives an input shaft (12). The input shaft is coaxial with an output shaft (14), a free end (14a) of which extends beyond the housing. A planetary sun gear differential (36) is contained within the housing, and the differential transmits torque both to the output shaft and to a sleeve (28) which coaxially surrounds a portion of the drive shaft that is within the housing. The sleeve, in turn, transmits torque to an intermediate shaft (42), which is spaced from and extends generally parallel to the sleeve, through a sprocket and chain drive (52, 54, 56), all portions of which are within the housing. The intermediate shaft terminates in front of and externally to the housing within a housing extension (48), which is removably secured to the housing by bolts (50). Torque from the intermediate shaft is transmitted to a forward output shaft (38) through a constant velocity universal joint (40), all portions of which are contained within the housing extension. The use of the universal joint permits the forward output shaft to rotate about an axis which is at a variable angle with respect to the axis of rotation of the intermediate shaft.

10 Claims, 3 Drawing Sheets

VARIABLE ANGLE FRONT OUTPUT SHAFT TRANSFER CASE

FIELD OF THE INVENTION

This invention relates to a transfer case for transferring torque to a plurality of drive axles of an automotive vehicle. More particularly, this invention relates to a transfer case which can be applied in various vehicle configurations requiring different included angles between the transfer case front wheel drive output shaft and the other drive shafts of a transfer case.

BACKGROUND OF THE INVENTION

U.S. Pat. No. 4,103,753 (J. W. Holdeman) describes a power transfer device of a type which is suited for use as a torque transfer case in an automotive vehicle, where such a transfer case serves to transmit torque from an engine or prime mover to a plurality of drive axles to thereby drive front and rear pairs of vehicle wheels.

U.S. Pat. No. 4,289,213 (R. L. Seaman) describes a transfer case of the foregoing type which utilizes a cardan-type universal joint within the transfer case itself, in combination with an external cardan-type universal joint, to transmit torque to an output or propeller shaft for driving the forward axle of the vehicle. The invention of the aforesaid U.S. Pat. No. 4,289,213 made it possible to reduce the included angle that would otherwise exist between the parallel axes of rotation of the other rotating axles of the transfer case and the axis of the output shaft for driving the driven front axle, relative to that which would exist in an arrangement utilizing only a pair of external cardan-type universal joints. Any such reduction in included angle is beneficial in reducing vibrations within the suspension system of the vehicle and in increasing the useful life of the universal joint components, and may permit a beneficial simplification in the design and thereby a reduction in the manufacturing cost of the universal joint.

The disclosures of the aforesaid U.S. Pat. Nos. 4,103,753 and 4,289,213, which are assigned to the assignee of this application, are incorporated by reference.

SUMMARY OF THE INVENTION

According to the present invention there is provided an improved transfer case for an automotive vehicle that is capable of being driven in four-wheel drive, the transfer case of the present invention incorporating a separate housing for its front wheel drive output or propeller shaft. The separate housing of the transfer case of the present invention houses at least one cardan-type constant velocity universal joint, or other constant velocity type universal joint, to permit the transfer case to transmit torque to the axle for the front wheels of the vehicle along an axis that extends at an acute, included angle with respect to the axes of rotation of the other rotatable members of the transfer case.

By enclosing the cardan-type or other universal joint of a transfer case front wheel drive output shaft in a separate housing, as opposed to enclosing it within the transfer case housing itself, it is possible to adapt an otherwise standard transfer case to various vehicle configurations, for example, to configurations requiring substantially different front wheel drive output shaft internal joint angles. Thus, for low volume, special purpose four-wheel drive vehicles, it is only necessary to provide special tooling to manufacture the output shaft housing, whereas special tooling for the entire transfer case housing would be normally required according to the teachings of the aforesaid U.S. Pat. No. 4,289,213.

Accordingly, it is an object of the present invention to provide an improved transfer case for transmitting torque to a pair of drive axles of an automotive vehicle. More particularly, it is an object of the present invention to provide a transfer case of the foregoing character which is readily adapted to a variety of vehicle configurations requiring substantially different front wheel drive shaft internal angles.

For a further understanding of the present invention and the objects thereof, attention is directed to the drawing and the following brief description thereof, to the detailed description of the preferred embodiment, and to the appended claims.

IN THE DRAWING

DETAILED DESCRIPTION OF THE PREFERRED EMBODIMENT

Figure 1A:
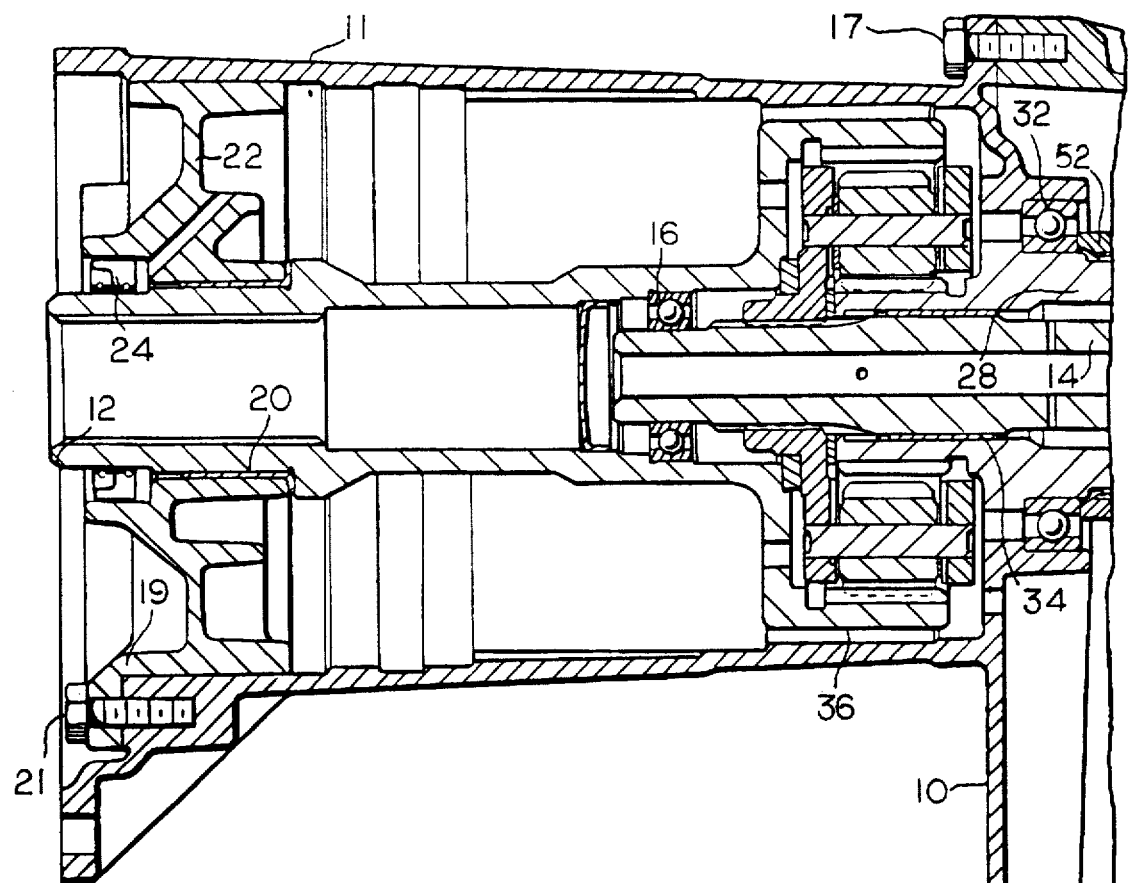
FIG. 1 is an elevational view, in cross-section, of the forward portion of a transfer case according to preferred embodiment of the present invention.
FIG. 1B is a view similar to FIG. 1A of the rearward portion of the transfer case of FIG. 1A, FIGS. 1A and 1B illustrating a complete transfer case.
Figure 1B:
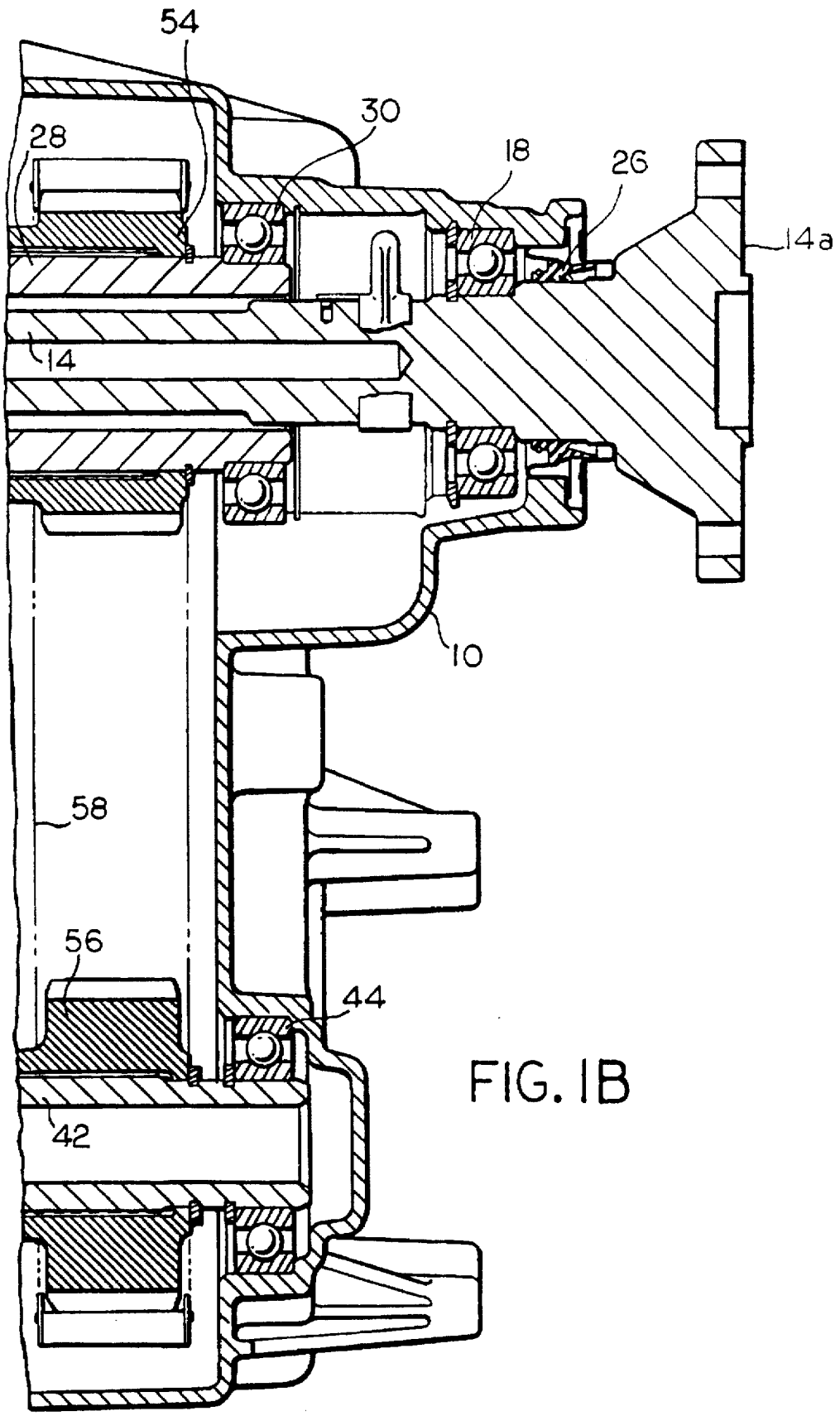
Figure 2:
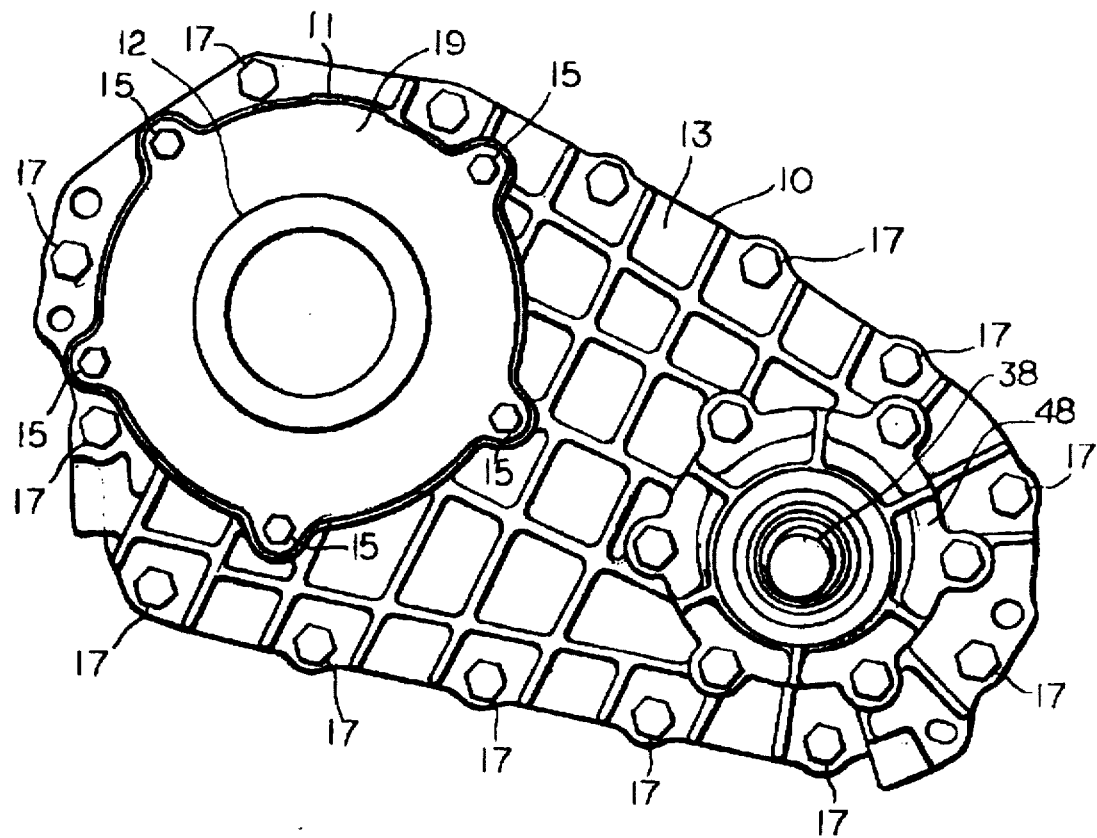
FIG. 2 is a front view of the transfer case of FIGS. 1A and 1B.

A transfer case according to a preferred embodiment of the present invention has a housing 10 which is assembled from a plurality of elements, each of which is formed from metal by casting or die casting. The housing 10 encloses the rearward portion of an internally splined annular shaft 12, which receives torque from a prime mover, not shown, such as the output shaft of the transmission of an automotive vehicle. Alternatively, the annular shaft 12 can be the output shaft of the transmission of an automotive vehicle.

The forward portion of the shaft 12 is received in a separate housing extension 11, which is bolted to a housing cover plate 13 by means of bolts 15, the housing cover plate 13, in turn, being bolted to the housing 10 by bolts 17.

The rearward portion of the shaft 12 has the forward portion of an output shaft 14 positioned coaxially therein, and the output shaft 14 has a flanged free end 14a for connection to a propeller shaft, not shown, for powering a rear axle differential, also not shown. Alternatively, the output shaft 14 may be connected to a propeller shaft by a splined connection in accordance with the teachings of U.S. Pat. No. 5,286,232 (Engle), the disclosure of which is also incorporated by reference. In any case, the output shaft 14 is rotatingly supported relative to the shaft 12 by a bearing 16 near the forward end of the output shaft 14, and is rotatingly supported relative to the housing 10 by a bearing 18 near the rearward end of the output shaft 14.

The forward portion of the shaft 12 is rotatingly supported relative to a cover plate 19 of the housing extension 11 by a bushing or sliding bearing 20 which is retained in an annular support member 22, the cover plate 19 being bolted to the housing extension 11 by bolts 21. The annular support member 22 also retains an annular seal 24 which sealingly engages the exterior of the shaft 12 in an endless pattern to retain lubricant within the housing 10, notwithstanding the rotation of the shaft 12. Likewise, the housing 10, which retains the bearing 18, also retains an annular seal 26, and the annular seal 26 sealingly engages the exterior of the shaft 14 in an endless pattern to retain lubricant within the housing 10.

A forward portion of the rear output shaft 14 is concentrically positioned within a sleeve 28 and the sleeve 28 is rotatably supported relative to the housing 10 by bearings 30 and 32, and the sleeve 28 is also rotatably supported relative to the output shaft 14 by a bushing or sliding bearing 34. The sleeve 28, in a known manner, is used to drive a planetary gear differential, shown generally at 36, which serves to divide the torque that is delivered to it by the input shaft 12 between the rear output shaft 14 and an internally splined forward output shaft 38.

The forward output shaft 38 is connected to an intermediate shaft 42 by a universal joint of the constant velocity type, such as a cardan joint 40, the cardan joint 40 sometimes being referred to as a Hookes joint, permitting the output shaft 38 to be driven with its axis of rotation at an angle with respect to the axis of rotation of the intermediate shaft 42. The included angle between the axis of rotation of the output shaft 38 and the axis of rotation of the intermediate shaft 42 can vary from vehicle type to vehicle type, and a typical cardan joint can accommodate an included angle of the foregoing type up to approximately 3°.

The intermediate shaft 42 is rotatably supported relative to the housing 10 by bearings 44 and 46, and the output shaft 38, together with the bearing 46 and the cardan joint 40, is contained within a separate housing extension 48 that is bolted to the housing 10 by bolts 50. The output shaft 38 is further rotatably supported relative to the housing extension 48 by a bearing 52. The use of a separate housing extension 48, as described, permits varying the length of such portion of a transfer case without requiring the use of a different housing 10, for example, to incorporate a double cardan joint in place of the cardan joint 40. In that regard, the use of a double cardan joint may be required when the included angle between the axis of rotation of the output shaft 38 and the axis of rotation of the intermediate shaft 42 is greater than can be provided by a single cardan joint. In such cases a different housing extension can be used in place of the housing extension 48 to permit a single design of the housing 10 to be used in multiple transfer case applications.

The intermediate shaft 42 is caused to rotate by the rotation of the sleeve 28 through a sprocket 54 that is keyed to the sleeve 28, a sprocket 56 that is keyed to the intermediate shaft 42 and an endless drive chain 58 that is trained around the sprockets 54, 56. The rotation of the forward output shaft 38 by virtue of the rotation of the intermediate shaft 42 through the cardan joint 40, as described, is sealed by an annular seal 60, which is retained in housing extension 50 and sealingly engages the forward output shaft 38 in an endless pattern.

Although the best mode contemplated by the inventor(s) for carrying out the present invention as of the filing date hereof has been shown and described herein, it will be apparent to those skilled in the art that suitable modifications, variations, and equivalents may be made without departing from the scope of the invention, such scope being limited solely by the terms of the following claims and the legal equivalents thereof.

What is claimed is:

1. A transfer case comprising:

a housing (10);

an input shaft (12) extending from a location external to said housing into said housing, said input shaft being rotatable with respect to such housing;

an output shaft (14) extending coaxially with said input shaft from a location within said housing to a location rearwardly external to said housing, said output shaft being rotatable with respect to said housing;

a sleeve (28) surrounding a portion said output shaft;

bearing means (34) for permitting said output shaft to rotate with respect to said input shaft;

differential means (36) for receiving rotational torque from said input shaft and for transmitting rotational torque from said input shaft to said output shaft and to said sleeve;

an intermediate shaft (42) spaced from and extending generally parallel to said sleeve, said intermediate shaft having a first portion positioned within said housing and a second portion, said intermediate shaft being rotatable with respect to said housing;

drive means (54, 56, 58) for transmitting rotational torque from said sleeve to said first portion of said intermediate shaft;

a housing extension (48), said housing extension being removably attached to said housing and receiving said second portion of said intermediate shaft;

a forward output shaft (38), said forward shaft being rotatable with respect to said housing extension and having a first portion within said housing and a second portion extending forwardly external to said housing extension; and universal joint means (40) contained within said housing extension for connecting said intermediate shaft to said forward output shaft to permit said forward output shaft to rotate about an axis of rotation which is at an angle with respect to an axis of rotation of said intermediate shaft.

2. A transfer case according to claim 1 wherein said universal joint means comprises at least one constant velocity universal joint.

3. A transfer case according to claim 1 wherein said universal joint means comprises at least one cardan joint.

4. A transfer case according to claim 1 and further comprising:

second bearing means (52) positioned within said housing extension for rotatably supporting said forward output shaft with respect to said housing extension.

5. A transfer case according to claim 4 and further comprising:

annular seal means (58) secured to said housing extension for engaging said forward output shaft in an endless pattern.

6. A transfer case according to claim 5 and further comprising third bearing means (44) positioned within said housing for rotatably supporting said intermediate shaft with respect to said housing.

7. A transfer case according to claim 1 and further comprising:

bolt means for removably connecting said housing extension to said housing.

8. A transfer case according to claim 4 and further comprising:

spaced apart fourth bearing means (30, 32) for rotatably supporting said sleeve with respect to said housing.

9. A transfer case according to claim 8 wherein said input shaft is annular, and wherein said output shaft has a portion which is surrounded by a portion of said input shaft, and further comprising:

fifth bearing means (16) between said portion of said input shaft and said portion of said output shaft for rotatably supporting said output shaft with respect to said input shaft.

10. A transfer case according to claim 1 wherein said output shaft has a flanged free end (14a) at a location external to said housing.

* * * * *